United States Patent
Scattergood et al.

(10) Patent No.: US 6,864,944 B1
(45) Date of Patent: Mar. 8, 2005

(54) ELECTRO-OPTIC DEVICE

(75) Inventors: David C Scattergood, Malvern (GB); Maurice Stanley, Malvern (GB); Timothy D Wilkinson, Cambridge (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 09/868,219

(22) PCT Filed: Dec. 16, 1999

(86) PCT No.: PCT/GB99/04285

§ 371 (c)(1), (2), (4) Date: Sep. 12, 2001

(87) PCT Pub. No.: WO00/37994

PCT Pub. Date: Jun. 29, 2000

(30) Foreign Application Priority Data

Dec. 19, 1998 (GB) .............................. 9827952

(51) Int. Cl.$^7$ ........................................ G02F 1/1339
(52) U.S. Cl. .................. 349/156; 349/149; 438/25; 438/26; 438/27
(58) Field of Search ................. 349/149, 158

(56) References Cited

U.S. PATENT DOCUMENTS

| | | | |
|---|---|---|---|
| 3,751,137 A | | 8/1973 | Fitzgibbons et al. |
| 5,486,946 A | | 1/1996 | Jachimowicz et al. |
| 5,497,258 A | * | 3/1996 | Ju et al. ................ 349/58 |
| 5,543,958 A | | 8/1996 | Lebby et al. |
| 5,699,073 A | * | 12/1997 | Lebby et al. ............. 345/82 |
| 6,022,760 A | * | 2/2000 | Lebby et al. ............ 438/123 |
| 6,150,724 A | * | 11/2000 | Wenzel et al. ........... 257/777 |
| 6,690,444 B1 | * | 2/2004 | Wilkinson et al. ........ 349/153 |
| 2003/0161126 A1 | * | 8/2003 | Wilkinson et al. ........ 361/788 |
| 2003/0174117 A1 | * | 9/2003 | Crossland et al. ........ 345/100 |

* cited by examiner

Primary Examiner—John F. Niebling
Assistant Examiner—Angel Roman
(74) Attorney, Agent, or Firm—Nixon & Vanderhye P.C.

(57) ABSTRACT

An electro-optic device such as a smectic liquid crystal cell 1 with an active semiconductor backplane 3 is mounted on a hybrid substrate 2, for example of alumina or silica. Other active or passive electronic or optical components may also be mounted on the substrate, and interconnected by conductive tracks, for example by wire bonding 17, and the substrate itself may be mounted on a printed circuit board. The substrate may comprise a heat sink. The arrangement facilitates the safe connection of the liquid crystal cell and good optical alignment thereof.

13 Claims, 3 Drawing Sheets

ELECTRO-OPTIC DEVICE

This application is the US national phase of International Application No. PCT/GB99/04285, filed 16 Dec. 1999, which designated the U.S., the entire content of which is hereby incorporated by reference.

BACKGROUND OF THE INVENTION

1. Field of the Invention

The present invention relates to the mounting of active optical devices which are electrically driven.

2. Discussion of Prior Art

While the reference to active optical devices which are electronically driven includes devices exhibiting an electro-optic effect, it also encompasses any other active or variable optical device which requires an electrical input, even if the optical effect is not an electro-optic one—for example a magneto-optic effect where the magnetic field is produced by electrical means, or a device in which mechanical movement is produced electrically. Hereafter, all such devices will be termed electro-optic devices.

There has been a requirement for increasing speed of operation of electro-optic devices. At the same time there has also been a requirement for more complex devices, for example spatial light modulators comprising a matrix with a large number of pixels for high resolution of an image, or more accurate signal processing, which in itself leads to an increase in the time needed to address an individual pixel matrix, due both to the increasing complexity of the addressing system and the length of conductors needed to reach pixel, and also an increase in time necessary to address all pixels in the matrix.

In part, improved speed has been facilitated by the discovery of new effects or materials—thus in the field of liquid crystal technology the use of fast switching chiral smectic liquid crystal materials has become increasingly important. Also, as with many electronic devices, improved speed can be obtained by making the devices smaller, to reduce conductor lengths.

One construction of electro-optic spatial modulator device that has become increasingly significant is that using an active backplane. The latter is normally used in conjunction with a spaced opposed front electrode, with electro-optic material in the gap between the backplane and front electrode.

Recently there been developed a novel spatial light modulator in the form of a smectic liquid crystal layer disposed between an active semiconductor backplane and a common front electrode. It was developed in response to a requirement for a fast and, if possible, inexpensive, spatial light modulator comprising a relatively large number of pixels (for example, 320×240 or 640×480) with potential application not only as a display device, but also for other forms of optical processing such as correlation and holographic switching. Depending on the manner in which it is driven, and the value of the applied voltage, the modulator may be driven at a line rate of at least 10 MHz and a frame rate of up to 15 to 20 kHz, requiring a data input of around 1 to 1.5 Gpixel per second. Typically, while the pixel address time is around 100 nanoseconds, the pixel will actually take around 1 to 5 microseconds to switch between optical states; and while overall frame writing time is of the order of 24 microseconds, the frame to frame writing period is around 80 microseconds.

Our copending International Patent Applications of even filing and priority dates PCT/GB99/04286 and PCT/GB99/04276, refs: P20958WO and P20958WO1, both priority GB9827965.6; PCT/GB99/04232, ref P20959WO, priority GB9327900.3; PCT/GB99/04279, ref P20960WO, priority GB9827901.1; PCT/GB99/04274, ref: P20961WO, priority GB9827964.9; PCT/GB99/04275, ref; P20962WO, priority GB9827945.8; and PCT/GB99/04260 and PCT/GB99/04277, refs: P20963WO and P20963WO1, both priority GB 9327944.1) relate to other inventive aspects associated with this spatial light modulator.

The liquid crystal phase has been recognized since the last century, and there were a few early attempts to utilise liquid crystal materials in light modulators, none of which gave rise to any significant successful commercial use. However, towards the end of the 1960s and in the 1970s, there was a renewed interest in the use of liquid crystal materials in light modulating, with increasing success as maze materials, and purer materials became available, and as technology in general progressed.

Initially, liquid crystal light modulators were in the form of a single cell comprising a layer of liquid crystal material sandwiched between opposed electrode bearing plates, at least one of the plates being transparent. At a later stage, electrooptic nematic devices comprising a plurality of pixels were being devised. Initially, these had the form of a common electrode on one side of a cell and a plurality of individually addressable passive electrodes on the other side of the cell (e.g. as in a seven-segment display), or, for higher numbers of pixels, intersecting passive electrode arrays on either side of the cell, for example row and column electrodes which were scanned. While the latter arrangements provided considerable versatility, there were problems associated with cross-talk between pixels.

The situation was exacerbated when analogue (grey scale) displays were produced by analogue modulation of the applied voltage, since the optical response is non-linearly related to applied voltage. Addressing schemes became relatively complicated, particularly if dc balance (see below) was also required. Such considerations, in association with the relative slowness of switching of nematic cells, have made is difficult to provide real-time video images having a reasonable resolution.

Subsequently, active back-plane devices were produced. These comprise a back plane comprising a plurality of active elements, such as transistors, for energising corresponding pixels, normally for cooperation with a spaced opposed front electrode (counterelectrode) which is often common to all the active elements. Two common forms of active backplane are thin film transistor on silica/glass backplanes, and semiconductor backplanes. In some cases the active elements can be arranged to exercise some form of memory function, in which case addressing of the active element can be accelerated compared to the time needed to address and switch the pixel, easing the problem of displaying at video frame rates.

Active backplanes are commonly provided in an arrangement very similar to a dynamic random access memory (DRAM) or static random access memory (SRAM). At each one of a distributed array of addressable locations, a SRAM type active backplane comprises a memory cell including at least two coupled transistors arranged to have two stable states, so that the cell (and therefore the associated liquid crystal pixel) remains in the last switched state until a later addressing step alters its stale. Each location electrically drives its associated liquid crystal pixel, and is bistable per se, i.e. without the pixel capacitance. Power to drive the pixel to maintain the existing switched state is obtained from busbars which also supply the array of SRAM locations. Addressing is normally performed from peripheral logic via orthogonal sets (for example column and row) addressing lines.

In a DRAM type active backplane, a single active element (transistor) is provided at each location, and forms, together with the capacitance of the associated liquid crystal pixel and counterelectrode, a charge storage cell. Thus in this case, and unlike a SRAM backplane, the liquid crystal pixels are an integral part of the DRAM of the backplane. There is no bistability associated with the location unless the liquid crystal pixel itself is bistable, and this is not usually the case so far as nematic pixels are concerned (although there is one nematic device involving parallel alignment on both substrates with a chiral nematic material, the substrate spacing corresponding to a twist of 90° in the nematic material. In theory this has two stable states according to whether the twist in increased or decreased to accommodate the substrate alignment). Instead, reliance is placed on the active element providing a high impedance when it is not being addressed to prevent leakage of charge from the capacitance, and on periodic refreshing of the DRAM location.

Thin film transistor (TFT) backplanes comprise an array of thin film transistors distributed on a substrate (commonly transparent) over what can be a considerable area, with peripheral logic circuits for addressing the transistors, thereby facilitating the provision of large area pixellated devices which can be directly viewed. Nevertheless, there are problems associated with the yields of the backplanes during manufacture, and the length of the addressing conductors has a slowing effect on the scanning. When provided on a transparent substrate, such as of glass, TFT arrays can actually be located on the front or rear surface of a liquid crystal display device.

In view of their overall size, the area of the TFT array occupied by the transistors, associated conductors and other electrical elements, e.g. capacitors is relatively insignificant. There is therefore no significant disadvantage in employing the SRAM configuration as opposed to the DRAM configuration. This sort of backplane thus overcomes many of the problems associated with slow switching times of liquid crystal pixels.

Generally, the active elements in TFT backplanes are diffusion transistors and the like as opposed to FETS, so that the associated impedances are relatively low in the "OFF" state (so that charge leakage could be significant for DRAM type TFT backplanes).

Semiconductor active backplanes are limited in size to the size of semiconductor substrate available, and are not suited for direct viewing without intervening optics. Nevertheless their very smallness aids speed of addressing of the active elements. This type of backplane commonly comprises FETs, for example MOSFETs or CMOS circuitry, with associated relatively high impedances and relatively low charge leakage in the "OFF" state.

However, the smallness also means that relative to the overall display (array) area the area of the backplane occupied by the transistors, associated conductors and other electrical elements, e.g. capacitors can be relatively significant, particularly in the SRAM type which requires many more elements than the DRAM type. Being opaque to visible light, a semiconductor backplane would provide the rear substrate of a light modulator or display device.

At a later period still, substantial development occurred in the use of smectic liquid crystals. These have potential advantages over nematic phases insofar as their switching speed is markedly greater, and with appropriate surface stabilisation the ferroelectric smectic C phases should provide devices having two stable alignment states, i.e. a memory function.

The thickness of the layer of liquid crystal material in such devices is commonly much smaller than in the corresponding nematic devices, normally being of the order of a few microns at most. In addition to altering the potential switching speed, this increases the unit capacitance of a pixel, easing the function of a DRAM active backplane in retaining a switched state at a pixel until the next address occurs.

However, as the thickness of the liquid crystal approaches the thicknesses associated with the underlying structure of the backplane and/or the magnitude of any possible deformation of the liquid crystal cell structure by flexing or other movement of the substrates, problems arise, for example as to the uniformity of response across the pixel area, and the capability for short circuiting across the cell thickness. The alignment in chiral smectic liquid crystal cells is also frequently very sensitive to mechanical factors, and can be destroyed by mechanical impulses or shock.

It is known to mount electro-optic devices including liquid crystal devices with semiconductor active backplanes in a socket which is thereafter connected to a printed circuit board. The conductors at the edge of the semiconductor substrate are connected, for example by wire bonding, to the conductors of the socket. During the process of mounting the device to the socket, there is the risk of damage thereto, particularly to the semiconductor substrate.

Furthermore, it is not generally possible to guarantee precise physical alignment of the device in the socket, as will normally be required for an optical device, and arrangements for heat sinking are difficult.

European Patent Application No. 96306422.5 (IBM) discloses the lamination of a liquid crystal element which comprises a semiconductor wafer to an optically flat substrate, for example of glass, metal, silicon or a ceramic material. A thermosetting adhesive may be used for the lamination. However, in this case the laminated construction is then adjustably mounted in a holder and external connections are made to the liquid crystal element itself. The substrate appears to have no electrical function such as the provision of bonding pads or tracks for connection to the liquid crystal element of other electrical/electronic components. It is substantially coextensive with the wafer, whereas in the present embodiment a substantially larger hybrid substrate is provided with electrical tracks and pads supported thereon.

U.S. Pat. Nos. 5,543,958 and 5,486,946 (both Motorola) discloses the mounting of a liquid crystal light modulator on a substrate which may be of a ceramic material inter alia, and which bears other components connected to the modulator. There is no disclosure of mounting the substrate on a further printed circuit board, or of the provision of tracks/pads which would make this possible.

It will be appreciated that angular alignment of a relatively small object (e.g. an electro-optic device) involves small displacements of the object edges and so is correspondingly delicate. Alignment of a large object such as a printed circuit board on which the small object is mounted involves a correspondingly large displacement of the board edges, which may be so large as to be unacceptable.

SUMMARY OF THE INVENTION

However, by interposing a hybrid substance between the small object and a printed circuit board, angular alignment of the substrate to align the small object can involve an intermediate degree of movement of the substrata edges which is acceptably small, and yet not so small as in become a very delicate matter.

The present invention provides an electro-optic arrangement comprising an electro-optic device mounted on a hybrid substrate, the hybrid substrate being mounted on a printed circuit board. It also provides an electro-optic arrangement comprising an electro-optic device mounted on a hybrid substrate, the hybrid substrate being provided with conductive pads and/or tracks for providing a connection between the electro-optic device and a printed circuit board an which the hybrid substrate is to be mounted. Preferably the electro-optic device comprises an active backplane, and more preferably the active backplane is a semiconductor backplane.

Preferably the electro-optic device is a liquid crystal device, more preferably a smectic liquid crystal device.

Preferably the electro-optical device is mounted by means of adhesive such as an epoxy. Advantageously, the adhesive is a room temperature setting adhesive.

Furthermore it is desirable that the thermal expansion properties of the adhesive match those of the substrate.

It is thus relatively easy to mount a small electro-optic device on a hybrid substrata. The substrate mounting increases the mechanical strength of the device and reduces its susceptibility to mechanical shock. Equally importantly, it is easier to ensure accurate alignment of the electro-optic device in its optical system by manipulation of the larger hybrid substrata, and incorporation of the substrate into associated circuitry is also easier, with less risk of damage to the electro-optic device.

The hybrid substrate may be of ceramic material such as alumina or silica, for example. Such hybrid substrates are well known in the electronics art for assembling electronic components such as integrated circuits or chips and associated devices such as capacitors and resistors. In known manner, a hybrid substrate surface comprises bonding pads and/or conductive tracks. The bonding pads provide a means for connection and mounting of the various components, normally by surface mounting techniques or wire-bonding, and/or for making external connections. The conductive tracks run for example between bonding pads and/or components for interconnection thereof.

Preferably, in the present invention, wire bonding is used to connect exposed conductors on the electro-optical device to pads on the hybrid substrate from which conductive tracks extend. The hybrid substrate preferably includes edge pads extending from conductive tracks thereon, for connecting to external circuitry.

Beneficially, the hybrid substrate includes or is fitted with heat removal means, such as a metallic heat sink (cooled by means known per se, such as natural convection, a fan or a heat pipe) or a Peltier device. At operational speeds such as those mentioned at the commencement of this specification, it is important to ensure that the electro-optic modulator does not overheat, particularly in view of the limited temperature range over which most liquid crystal devices operate.

In one embodiment, the hybrid substrate has other electrical elements mounted thereon and coupled to the electro-optical device. Such elements may be active elements, such as a memory, multiplexer, control circuit or interface, or processor. Other active or passive optical elements could also or alternatively be mounted on the substrate.

BRIEF DESCRIPTION OF THE DRAWINGS

Further features and advantages of the invention can be derived from a consideration of the appended claims, to which the reader is referred, and of the following description of an embodiment of the invention made with reference to the accompanying drawings, in which:

DETAILED DISCUSSION OF EMBODIMENTS

Figure 1:
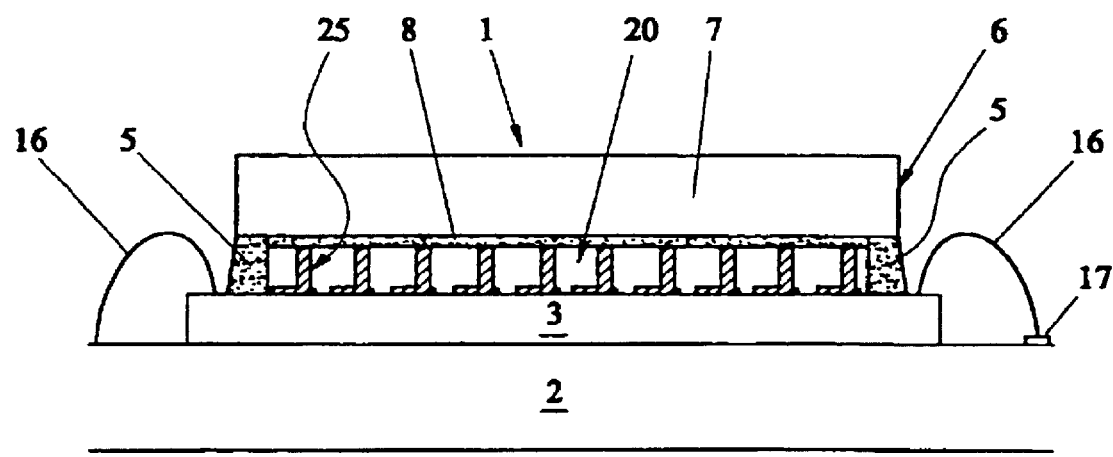
FIG. 1 shows in schematic cross-sectional view a liquid crystal cell that incorporates an active backplane and is mounted on a hybrid substrate.

FIG. 1 shows in schematic cross-sectional view a liquid crystal cell 1 mounted on a thick film alumina hybrid substrate or chip carrier 2. The cell 1 is shown in exploded view in FIG. 2.

Figure 2:
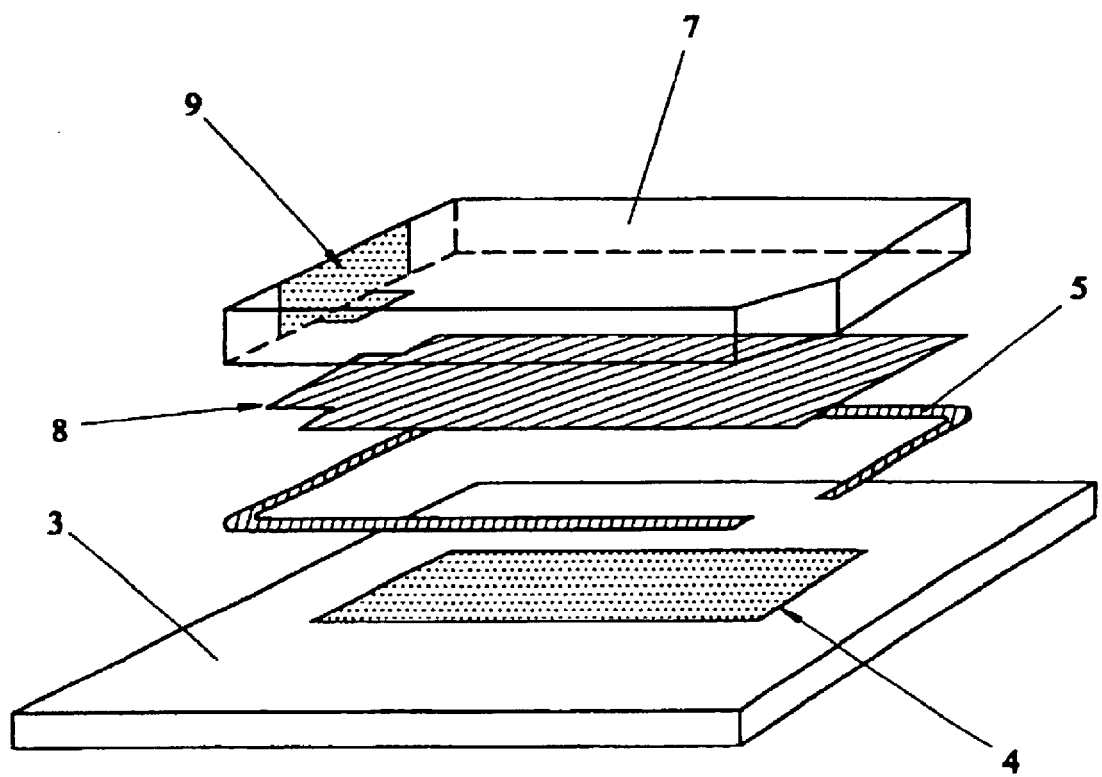
FIG. 2 is an exploded view of components of the liquid crystal cell of FIG. 1.

Cell 1 comprises an active silicon backplane 3 in which a central region is formed to provide an array 4 of active mirror pixel elements arranged in 320 columns and 240 rows. Outside the array, but spaced from the edges of the backplane 3, is a peripheral glue seal 5, which seals the backplane 3 to the peripheral region of a front electrode 6. FIG. 2 shows that the glue seal has an initial discontinuity to permit insertion of the liquid crystal material into the assembled cell, after which the seal is completed, either by more of the same glue, or by any other suitable material or means known per se.

Front electrode 6 comprises a generally rectangular planar glass or silica substrate 7 coated on its underside; facing the backplane 3, with a continuous electrically conducting silk screened indium-tin oxide layer 8. On one edge side of the substrate 7 is provided an evaporated aluminum edge contact 9, which extends round the edge of the substrate and over a portion of the layer 8, thereby providing an electrical connection to the layer 8 in the assembled cell 1.

Insulating spacers 25 formed on the silicon substrate of the backplane 3 extend upwards to locate the front electrode 6 a predetermined, precise and stable distance from the silicon substrate, and liquid crystal material 20 fills the space so defined. The spacers 25 and the backplane 3 are formed on the silicon substrate simultaneously with formation of the elements of the active backplane thereon, using all or at least some of the same steps. The spacers, the manner of locating and applying the glue seal and assembling the cell 25 are described in more detail in our copending application PCT/GB99/04282, ret P20959WO.

Figure 3:
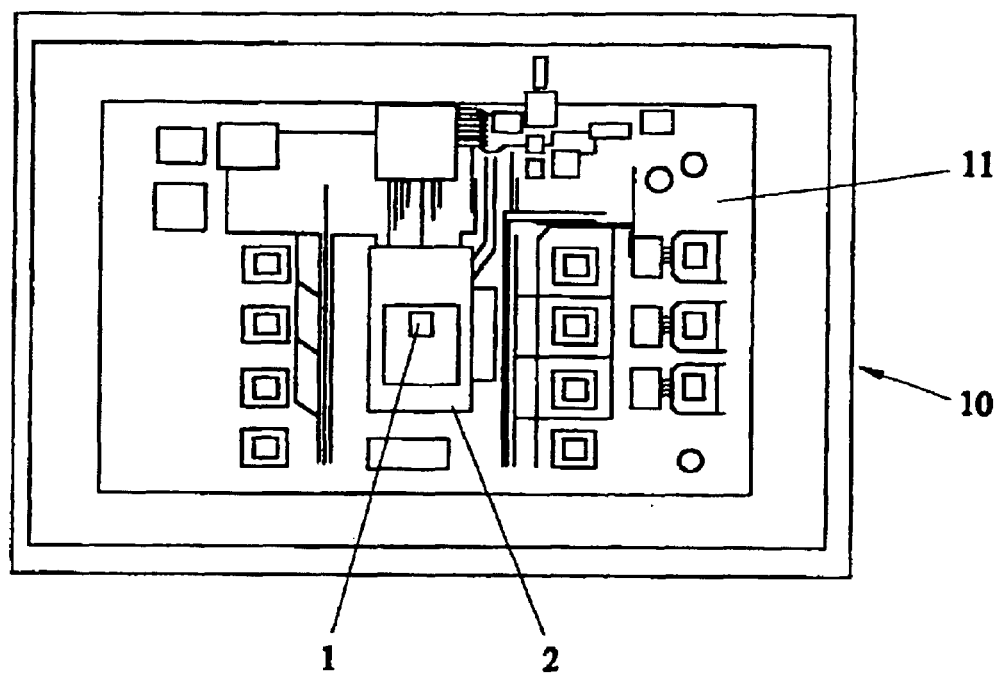
FIG. 3 is a general plan view of an electro-optic interface comprising the liquid crystal cell of FIG. 1.
Figure 4:
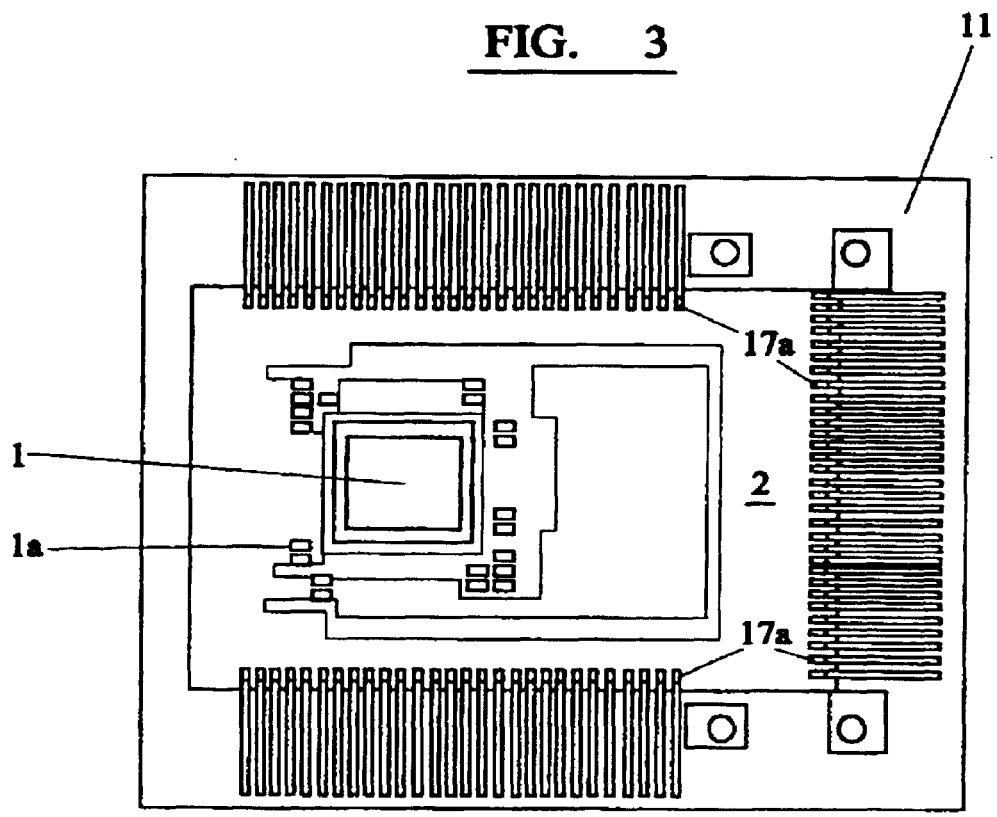
FIG. 4 is a closer view of the part of the interface of FIG. 3 illustrating the mounting of the liquid crystal cell of FIG. 1 via a hybrid substrate on a printed circuit board.

As shown in FIG. 3, the cell 1 forms part of an electro-optic interface 10 comprising a surface mounting printed circuit board (PCB) 11 on which is located the thick film alumina hybrid substrate or chip carrier 2, on which in turn in mounted the cell 1. FIG. 4 shows a closer view of the substrate 2 together with the adjacent portion of the PCB 11.

Figure 5:
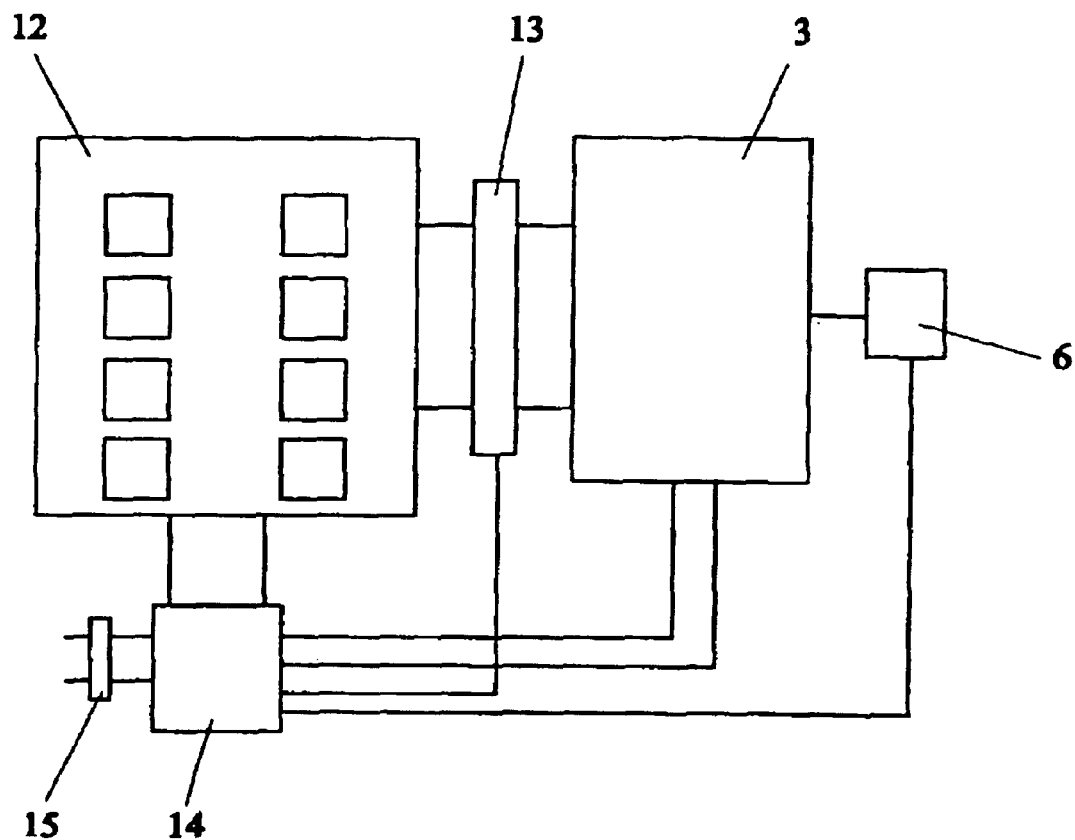
FIG. 5, is a schematic block circuit diagram of part of the interface of FIG. 3 showing circuitry closely associated with the liquid crystal cell.

FIG. 5 is a schematic outline of circuitry on the PCB 11 closely associated with operation of the cell 1, here shown schematically as backplane 3 and front electrode 6. Backplane 3 receives data from a memory 12 via an interface 13, and all of the backplane 3, front electrode 6, memory 12 and interface 13 are under the control of a programmable logic module 14 which is itself coupled to the parallel port of a PC via an interface 15.

In a preferred method of assembly, a wafer comprising a plurality of identical active backplanes 3 is diced, and a front electrode 6 is glued and sealed 5 to a die to provide an empty cell. Only subsequent to assembly of the front electrode is the die probed to confirm that it functions correctly, thereby avoiding the riskier procedure of an initial probing stop on the wafer itself. That this can be done with no economic or time loss is at least partly due to the high yield of workable backplanes on the wafer.

After probing, an empty cell with functioning backplane is secured to the hybrid substrate 2 by epoxy and wire bonded 16 to wire bonding pads 17 on the substrate 2. Optionally other circuit components 1a, FIG. 4, which could include for example some or all of those components shown in FIG. 5, are also surface mounted and electrically connected to conductive tracks (not shown) on the substrate 2. The latter tracks are part of a pattern of tracks provided on the substrate 2 in a desired configuration, for extending between the wire bonding pads 16 for the backplane, the other components, and means for connecting the substrate to the PCB 11 —conveniently the latter such means are in the form of edge pads 17a, but any suitable means known per se can be used.

Preferably only after the empty cell has been secured and bonded to the hybrid substrate 2 is it filled with a selected smectic liquid crystal material 20.

In a preferred method of assembly, the following steps are performed, starting from the processed silicon wafer and the glass substrate of the front electrode through to the assembled liquid crystal cell on the substrate.

The processed wafer is tested at a probe station, coated with a photoresist layer (planarisation), and diced with a wafer saw. After the glass substrate of the front electrode is cut, cleaned and provided with the indium tin oxide layer 8, the edge contact 9 of aluminium is evaporated thereon. Alignment layers of rubbed polyamide are then provided on both the diced wafer (die) and the front electrode 6, and the glue seal 5 is printed onto the front electrode prior to assembly as an unfilled cell. A preferred method of assembly of the die and front electrode is described in greater detail elsewhere in this specification. The unfilled cell is then adhered to the hybrid substrate 2, after which it is filled with a liquid crystal material 20.

The use of hybrid substrates is recognised as one of a number of methods for facilitating at relatively low risk the mounting and heat sinking of large scale active electronic devices such as computer memories and processors. However, when as in this case the large scale device is an optical device, there are further advantages in selecting this particular mode of mounting.

This particular method essentially avoids distortion of the backplane, and hence of the entire cell, so avoiding any associated degradation of the optical properties of the cell, or malfunctioning due to breaking of conductors or short circuits, for example. It also enable rear heat sinking to be effectively performed, as is necessary as pointed out above. There is also one very great advantage peculiar to optical devices which need to be accurately aligned in the optical system in which they occur for proper functioning. The epoxy mounting enables an accurate stress free alignment and positioning of the modulator cell on the hybrid substrate in all six degrees of freedom, the accurate mounting of the much larger substrate on the PCB 11 being much easier, and for which suitable adjusting means may be provided if required.

While the invention embraces the mounting of only a single major component on the backplane, viz, the liquid crystal cell, with or without ancillary minor components such as capacitors and resistors, additional major components could also be mounted thereon, particularly electrical components which also require a large number of electrical connections, or components which have a heat sinking requirement. Thus a VLSI component, such as the memory 12 of FIG. 5, which may have both a large number of connections and require heat sinking, could advantageously be mounted on the hybrid substrate. Indeed, all of the components shown in FIG. 5 could with advantage be mounted on the substrate and interconnected thereby.

Furthermore, depending on the type and function of the electro-optic device, it is conceivable that one or more further active devices, e.g. electro-optic modulators or lasers, or passive optical devices, such as polarisers or beam splitters could also be mounted on the substrate. One advantage would be the accurate optical alignment already mentioned above, including accurate alignment between different devices on the same hybrid substrate if necessary, or between different hybrid substrates on the same printed circuit board. Another advantage would be increased physical robustness.

What is claimed is:

1. An electro-optic arrangement comprising:
   an electro-optic device;
   a hybrid substrate, said electro-optic device is electrically connected to the hybrid substrate by wires and is adhesively mounted on said substrate;
   a printed circuit board; and
   at least one further optical element mounted on said hybrid substrate, wherein the hybrid substrate is mounted on said printed circuit board.

2. An electro-optic arrangement according to claim 1 wherein said electro-optic device comprises an active backplane.

3. An electro-optic arrangement according to claim 2, wherein said active backplane is an active semiconductor backplane.

4. An electro-optic arrangement according to claim 1, wherein the hybrid substrate is of ceramic material.

5. An electrooptic arrangement according to claim 4, wherein the ceramic material is alumina or silica.

6. An electro-optic arrangement according to claim 1, wherein the hybrid substrate includes heat removal means.

7. An electro-optic arrangement according to claim 1, wherein the hybrid substrate has other electrical or electronic elements mounted thereon and coupled to the electro-optical device.

8. An electro-optic arrangement according to claim 1, wherein the at least one further optical element comprises an active optical element.

9. An electro-optic arrangement according to claim 1, wherein the electro-optic device is a liquid crystal device.

10. An electro-optic arrangement according to claim 8 wherein the electro-optic device is a smectic liquid crystal device.

11. An electro-optic arrangement according to claim 8 wherein the electrooptic device is a chiral smectic liquid crystal device.

12. An electro-optic arrangement according to any preceding claim, wherein the hybrid substrate is provided with edge bonding pads.

13. An electro-optic arrangement according to claim 1, wherein said at least one further optical element comprises a passive optical element.

* * * * *